United States Patent
Abdullah et al.

(10) Patent No.: US 6,705,241 B2
(45) Date of Patent: Mar. 16, 2004

(54) TORISPHERICAL DOME FOR REFRACTORY VESSEL

(75) Inventors: Zia Abdullah, Federal Way, WA (US); John Peter Gorog, Kent, WA (US)

(73) Assignee: Weyerhaeuser Company, Federal Way, WA (US)

( * ) Notice: Subject to any disclaimer, the term of this patent is extended or adjusted under 35 U.S.C. 154(b) by 0 days.

(21) Appl. No.: 10/095,266

(22) Filed: Mar. 11, 2002

(65) Prior Publication Data

US 2003/0167985 A1 Sep. 11, 2003

(51) Int. Cl.[7] ............................. F23M 5/06; F27D 1/10
(52) U.S. Cl. ................... 110/334; 110/336; 432/252
(58) Field of Search .................. 52/396.01, 396.08, 52/573.1; 162/30.1, 30.11, 239, 240; 48/77; 432/247, 248, 251, 252; 110/334–336, 331, 332, 333, 335

(56) References Cited

U.S. PATENT DOCUMENTS

| | | | | |
|---|---|---|---|---|
| 1,556,125 A | * | 10/1925 | Popenhusen | 110/336 |
| 1,764,707 A | * | 6/1930 | Abbott | 110/336 |
| 2,240,190 A | * | 4/1941 | Longnecker | 110/99 |
| 2,272,015 A | * | 2/1942 | Lanyon | 110/99 |
| 2,295,352 A | * | 9/1942 | MacDonald | 72/38 |
| 2,296,392 A | * | 9/1942 | Marchant | 72/101 |
| 2,457,965 A | * | 1/1949 | Young | 110/99 |
| 2,548,908 A | * | 4/1951 | Pollen | 263/15 |
| 2,900,965 A | * | 8/1959 | Witzke | 122/6 Q |
| 3,198,147 A | * | 8/1965 | Usmiani | 110/99 |
| 3,198,148 A | * | 8/1965 | Hall | 110/99 |
| 3,340,831 A | * | 9/1967 | Stein et al. | 110/99 |
| 3,448,703 A | * | 6/1969 | Hansen et al. | 110/99 |
| 3,511,003 A | * | 5/1970 | Alleaume | 52/198 |
| 3,528,647 A | * | 9/1970 | Hyde | 263/19 |
| 4,035,974 A | * | 7/1977 | Kumpf | 52/249 |
| 4,225,054 A | * | 9/1980 | Jean | 220/436 |
| 4,505,210 A | * | 3/1985 | Schuck et al. | 110/336 |
| 4,794,748 A | * | 1/1989 | Schilf | 52/393 |
| 4,920,899 A | * | 5/1990 | Blundy et al. | 110/336 |
| 4,960,058 A | * | 10/1990 | Materna | 110/336 |

* cited by examiner

*Primary Examiner*—Kenneth Rinehart
(74) *Attorney, Agent, or Firm*—Christensen O'Connor Johnson Kindness PLLC

(57) ABSTRACT

A refractory vessel has a generally cylindrical metal shell and an upper torispherical dome. A refractory liner lines the shell and the dome. A layer of skew blocks are positioned between the cylindrical shell portion of the refractory liner and the dome portion. A metal band is positioned outwardly from said layer of skew blocks for restraining radial expansion thereof.

5 Claims, 2 Drawing Sheets

TORISPHERICAL DOME FOR REFRACTORY VESSEL

FIELD OF THE INVENTION

The present invention relates to refractory vessels and more particularly to a novel dome design for the refractory liner for such a vessel.

BACKGROUND OF THE INVENTION

Black liquor is a by-product of the wood pulping process. Black liquor is a mixture of hydrocarbon, caustic, chlorine and other corrosive chemicals. It is normally completely combusted in a recovery boiler. Inorganic chemicals including sodium sulfate and sodium sulfide are recovered for reuse in the pulping process. Heat produced by the complete combustion is converted to steam, which in turn is used to produce process heat and/or electrical power. An alternative device proposed for recovering inorganic chemicals from black liquor is a gasifier. In a gasifier, the black liquor is burned in a sub stoichiometric atmosphere to produce a combustible gas. Inorganic salts are recovered in the process. The combustible gases can be used directly to fuel a gas turbine, or combusted in a power boiler.

Low pressure gasification requires an insulated environment, which is obtained through a refractory lined vessel. Refractory vessels of current design for use as gasifiers employ a stainless steel jacket and a fused-cast alumina liner. The alumina liner normally has a first inner layer of blocks comprising both alpha and beta alumina and a second outer layer of blocks comprising beta alumina. A small expansion allowance is provided between the outer layer of beta alumina blocks and the stainless steel jacket.

After vessels of this design are operated for a few months, it has been found that the refractory materials react with the soda in the liquor and expand to completely consume the normal expansion allowance provided between the refractory and the stainless steel jacket. At this point, the refractory layers begin to press against the inside of the stainless steel jacket. This situation causes early failure in the refractory materials themselves and plastic deformation of the stainless steel jacket. As a consequence, refractory linings of a conventional design have been unsatisfactory for use in a black liquor gasifier.

SUMMARY OF THE INVENTION

The inventors have found that such refractory materials are not only subject to thermal expansion as is known in the prior art, but also to chemical expansion. Sodium from the black liquor combines with alumina to form sodium aluminate. Sodium aluminate expands on the order of 130% relative to the original alumina. This causes both radial and vertical expansion in the refractory lining toward the metal shell of the vessel and also against the dome of the metal shell. Prior dome designs were torispherical in shape. Torispherical domes employ a layer of skew blocks at their base. Prior skew block layers were restrained from expansion by direct contact against the metal shell. This however resulted in over constraining and overstressing the refractory lining as well as the metal shell.

It is therefore desirable to provide controlled expansion in a radial direction of the skew blocks forming the bottom layer of a torispherical dome without stressing the refractory lining or the exterior metal shell. This problem is solved in accordance with the present invention by a refractory vessel having a metal shell and a specially designed restrainer for the skew block layer. The vessel comprises a generally cylindrically metal shell having an upper torispherical dome. A refractory liner has a cylindrical portion spaced inwardly from the shell and a torispherical portion spaced inwardly from the torispherical dome. A circular layer of skew blocks is located between the cylindrical portion and the torispherical portion. A metal band is positioned outwardly from the layer of skew blocks for restraining radial expansion thereof. The metal band has a predetermined strength such that the radially outward force exerted by the skew block due to the dead weight of the refractory lining in the dome loads the band in tension to a stress just less than the yield stress of the material. This predetermined strength is determined on the basis of the weight of the refractory lining and the geometry of the torispherical dome. When the refractory lining in the dome experiences expansion because of chemical reaction, the skew block migrates radially outward. Since the support band is already loaded almost to its yield stress, it elongates without much additional resistance and allows expansion of the lining. Additional support in the form of metal foam is provided between the band and the shell. This material provides the necessary resistance for the chemical expansion process.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
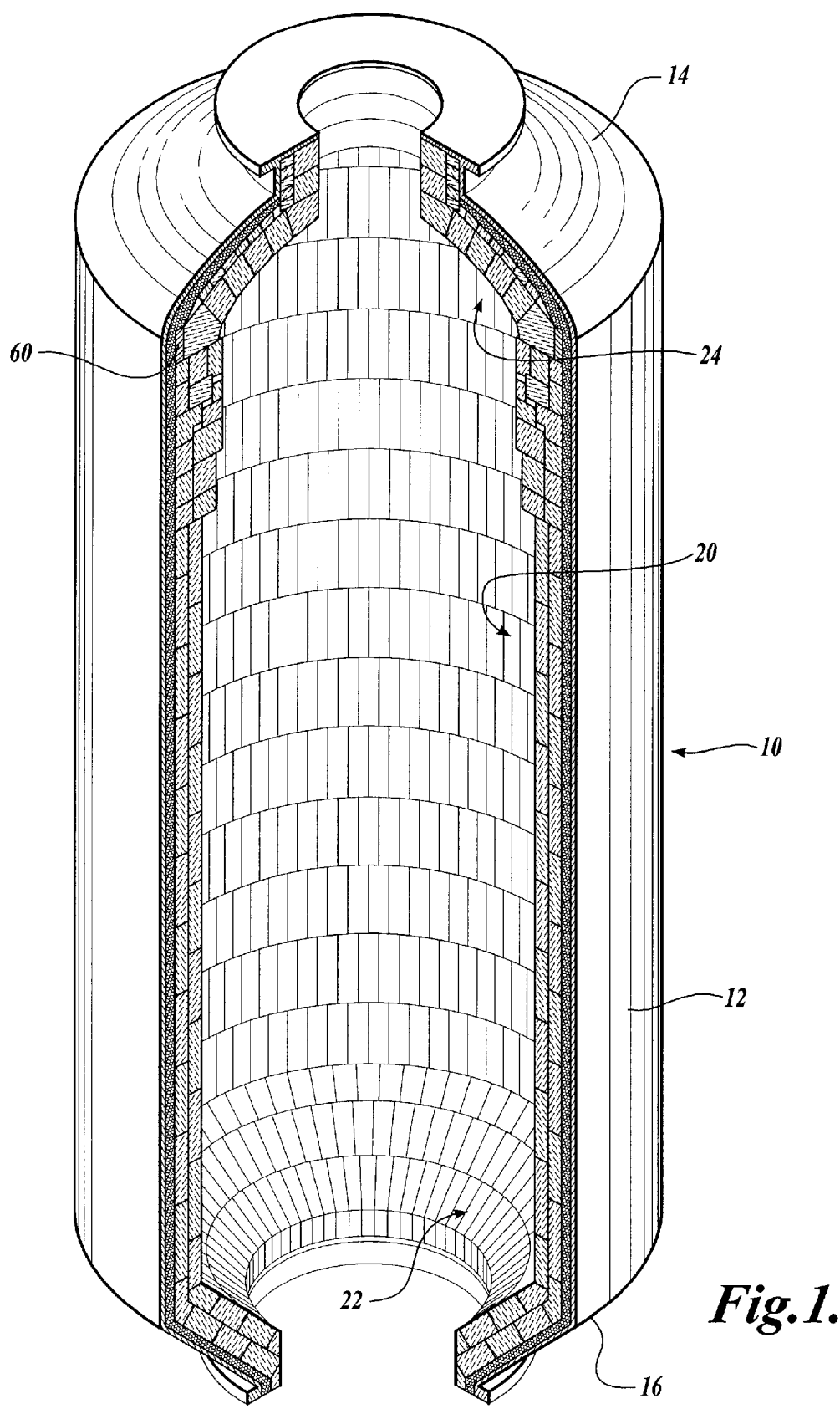
FIG. 1 is an isometric view of a refractory vessel constructed in accordance with the present invention with a preshaped vertical segment removed therefrom to expose the walls and the interior.
Figure 2:
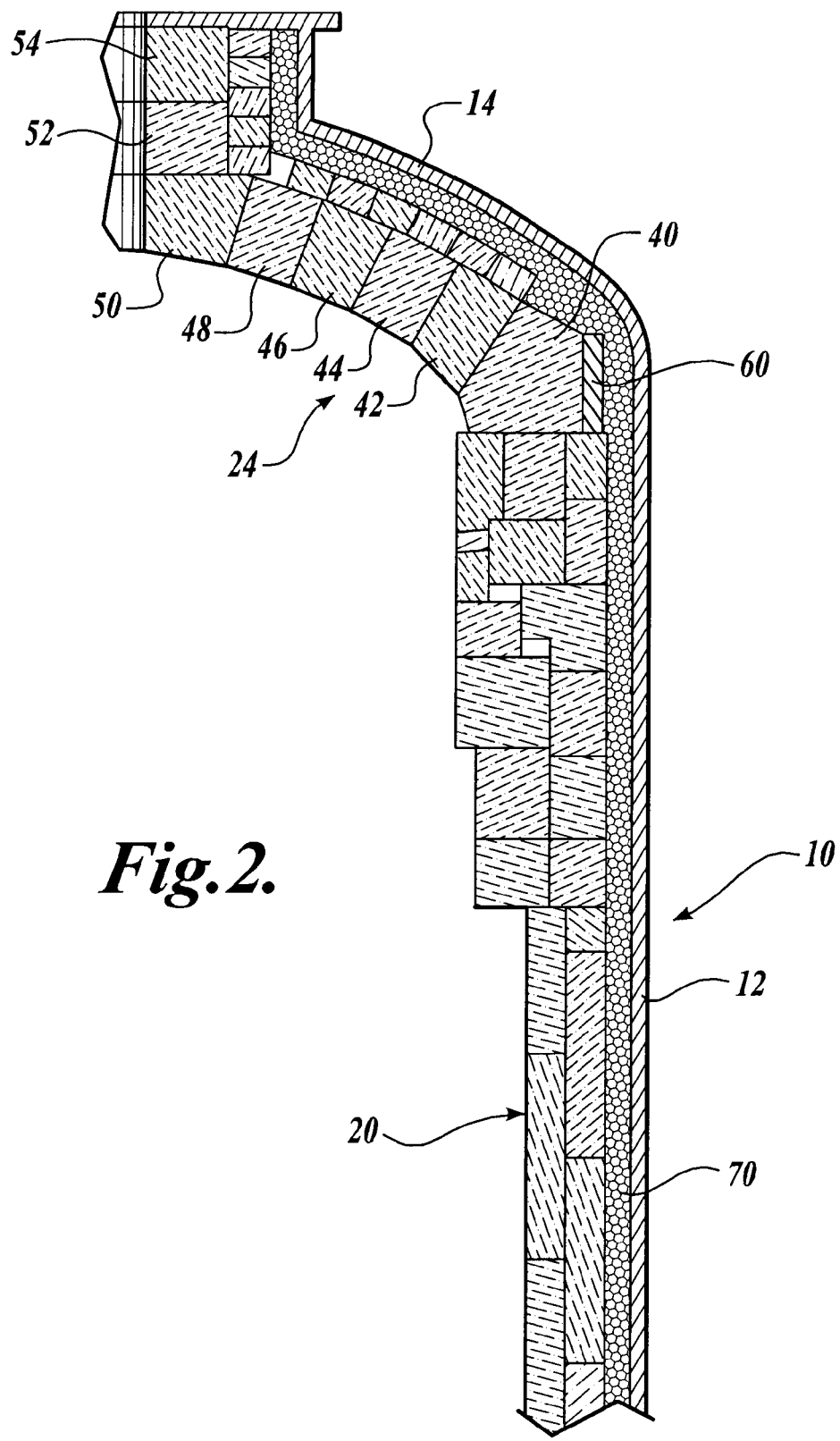
FIG. 2 is an enlarged cross-sectional view of the upper dome portion of the refractory vessel constructed of FIG. 1.

Referring first to FIGS. 1 and 2, the refractory vessel 10 has an outer shell 12 having an upper torispherical dome portion 14 and a lower support cone portion 16. A cylindrical refractory liner 20 is positioned inwardly from the cylindrical shell 12. It rests on a lower cone portion 22 in a conventional manner. An upper torispherical refractory dome portion of the refractory lining 24 is positioned above and rests on the upper end of the cylindrical refractory liner 20.

Referring to FIG. 2, the torispherical portion of the refractory dome 24 comprises a circular layer of skew blocks 40 and successive layers of blocks 42, 44, 46 and 48 each layer of which has a diameter that is slightly less than the preceding diameter. These layers are constructed in a conventional manner. An inner ring of blocks 50 is positioned as the last layer of the dome. Neck blocks 52 and 54 are stacked to form a layer cylindrical in shape and rest on the upper inner ring layer 50 of the torispherical dome. The upper opening to the vessel is formed by the layers of blocks 52 and 54.

The layer of skew blocks 40 has an outer generally cylindrical surface. A metal band 60 is fitted around the outer cylindrical surface of the layer skew blocks 40 in contacting relationship. The metal band can be made of any of a variety of materials, which would tolerate the thermal and gaseous environment behind the refractory lining. The metal band is chosen of a material and sized so as to be loaded to a stress just less than the yield stress of its material of construction. The metal band 60 will thus support the outward radial thrust of the skew blocks 40 because of the weight of the refractory in the dome and be loaded to a stress just less than its yield stress. When the dome refractory experiences chemical expansion, the radially outward thrust of the skew block will increase and the band will start to yield. This will allow the skew blocks to move out radially and the dome to expand when exposed to chemical reaction. The desirable yield strength of the metal band will be a function of the dome weight and dome geometry. The metal band for example may be made of carbon steel, stainless steel or any other suitable metal having the desirable yield stress. It has been found that a yield stress in the range of 0.5 to 4.0 MPa is satisfactory, while a yield stress of 1.0 to 3.0 MPa is preferred and a yield stress of from 1.5 to 2.5 MPa is most preferred.

If desired a layer of material having controlled crushability characteristics can be interposed as a liner 70 between the refractory liner 20, including the band 60, and the metal shell 12 and dome 14.

One such material that will function in this environment is foam material sold under the trademark Fecralloy™FeCrAlY. This material is an iron-chromium aluminum-yttrium alloy. The material has a nominal composition by weight %, respectively, of _72.8_% iron, 22_% chromium, _5_% aluminum, and _0.1_% yttrium and 0.1% zirconium. This metal foam is produced commercially by Porvair Fuel Cell Technology, 700 Shepherd Streel, Hendersonville, N.C. It has further been found that the yield strength of this metal foam, that is the compression stress at which the material will irreversibly begin to compress, can be varied depending upon the density of the foam. For example, a foam having a density on the order of 3–4% relative density will have a yield strength of about 1 MPa. A material having a relative density of about 4.5–6% will have a yield strength of approximately 2 MPa, while a material having a relative density greater than about 6% will have a yield strength of about 3 MPa or greater. Thus, a material having a yield strength of about 2 MPa has been found to be most desirable for use as a crushable liner 70 for refractory vessels used in the gasifier environment. Other metal foams composed of stainless steel, carbon steel, and other suitable metal and metal alloys that have the foregoing characteristics can also be used.

As the alumina refractory material is exposed to process conditions, over time the typical refractory liner will expand about 1 inch in the radial direction per year. It is therefore desirable to provide a crushable liner 70 that has an original thickness which allows a compression of 1 inch while providing a yield strength of less than or equal to 2 MPa.

Another desired characteristic of the crushable liner 70 is that it must be sufficiently conductive so as to maintain the temperature of the crushable liner under approximately 600° C. It has been postulated that at this temperature, certain species produced in the gasifier will condense to a solid. If such condensation is allowed to occur in the foam lining, it will fill with solid over time and lose its crushability, therefore becoming ineffective to selectively resist expansion of the refractory liner. It has been found that the composite metal foams just described have an adequate thermal conductivity on the order of 0.5 W/mK to maintain the outer surface of the brick at a temperature under 600° C.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A refractory vessel comprising:
    a generally cylindrical metal shell having an upper torispherical dome,
    a refractory liner having a cylindrical portion spaced inwardly from said shell and a torispherical portion spaced inwardly from said dome,
    a layer of skew blocks positioned between said cylindrical portion and said torispherical portion,
    a metal band positioned outwardly from said layer of skew blocks and in intimate contact therewith for restraining radial expansion of said skew blocks, said metal band having a predetermined strength chosen to support the weight of the dome but also having a yield stress that will allow the band to yield and provide restrained radially outward displacement of said skew blocks in a radial direction due to chemical expansion of the skew blocks of the dome caused by reaction of sodium with alumina to form sodium aluminate.

2. The vessel of claim 1, wherein said yield stress is determined by the weight of the refractory dome and the geometry of the dome.

3. The vessel of claim 2, wherein said yield stress ranges from 0.5 to 4.0 MPa.

4. The vessel of claim 3, wherein said yield stress ranges from 1.0 to 3.0 MPa.

5. The vessel of claim 4, wherein said yield stress ranges from 1.5 to 2.5 MPa.

* * * * *